Jan. 1, 1952     J. L. H. BISHOP     2,581,233
CAM FOR OPERATING VALVES OF INTERNAL-COMBUSTION ENGINES
Filed May 20, 1949     2 SHEETS—SHEET 1
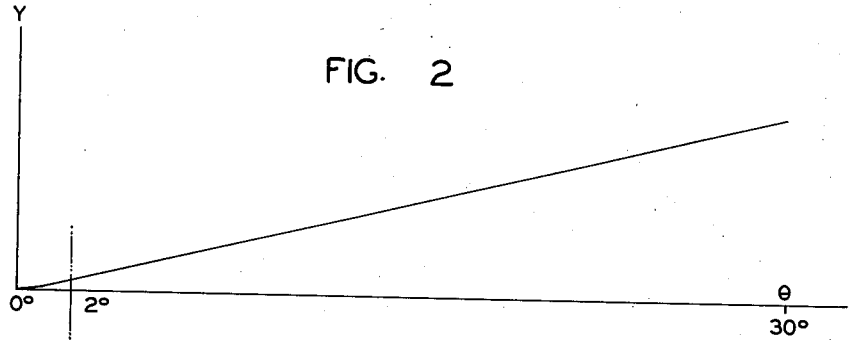
FIG. 2
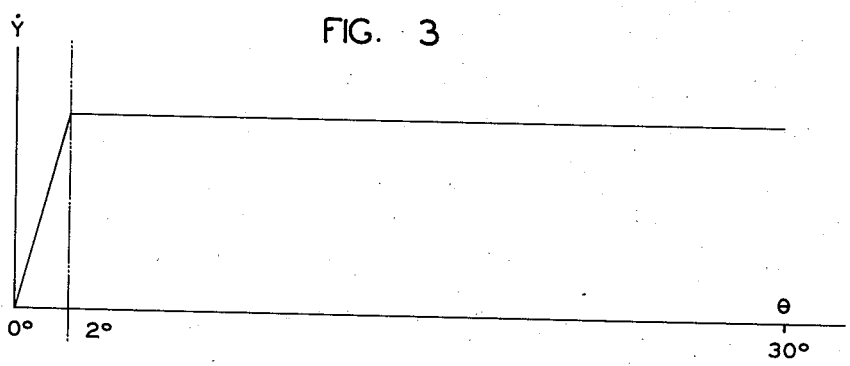
FIG. 3
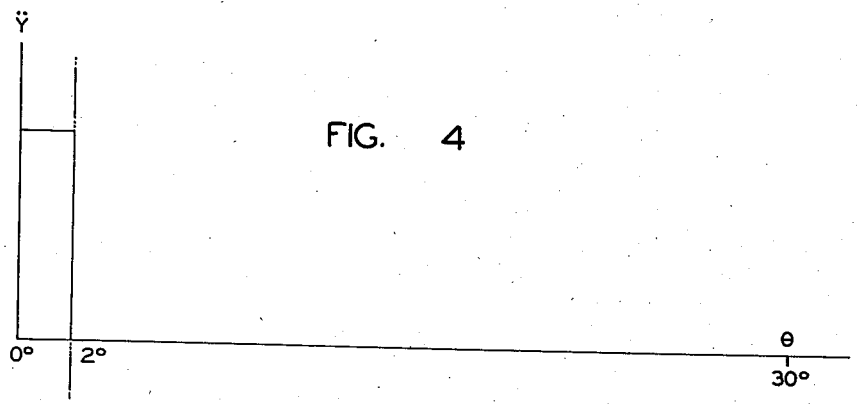
FIG. 4
FIG. 1
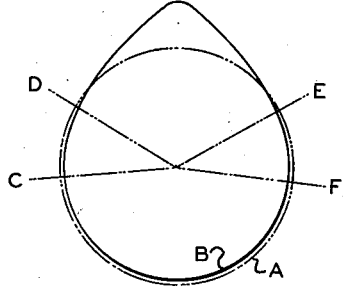
FIG. 8
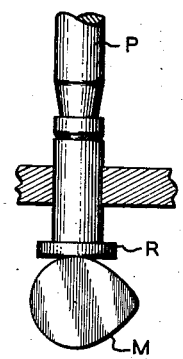
INVENTOR.
J. L.H. BISHOP
BY
*A. Yates Dowell*
ATTORNEY Patented Jan. 1, 1952

2,581,233

UNITED STATES PATENT OFFICE 2,581,233

CAM FOR OPERATING VALVES OF INTERNAL-COMBUSTION ENGINES

John L. H. Bishop, Northfield, Birmingham, England, assignor to The Austin Motor Company, Limited, Northfield, Birmingham, England Application May 20, 1949, Serial No. 94,342
In Great Britain June 7, 1948

3 Claims. (Cl. 123—90)

This invention relates to cams for the operation of valves of internal combustion engines, and more particularly the opening and closing ramps arranged for taking up the tappet clearance between the clearance circle and the base circle of the cam. An object of the present invention is to provide opening and closing ramps which result in minimum initial and final velocities of an actuated member such as a valve tappet while taking up tappet clearance to reduce the tappet and valve noise and still provide a relatively short ramp and thus avoid the obvious disadvantages of a long ramp. In an ordinary cam it is quite usual to arrange lift curves of the cam so that the first small part of the lift from the clearance circle to the base circle, for taking up tappet clearance, takes the form of a constant velocity lift ramp on the opening side and a similar ramp on the closing side, the two slopes being, however, often made unequal. The slope of the opening ramp determines the velocity at which the valve will be lifted off its seat and the closing ramp its seating velocity. As the constant slope of the ramps also determines the angular displacement of the cam which is required for a given tappet clearance, it will be apparent that a smaller constant slope improves the valve seating conditions but it has the disadvantage that it entails a greater angular displacement for the same clearance. With a constant velocity lift ramp there are therefore practical difficulties in achieving a low impact velocity, since it is not desirable for the length of the ramp to be more than about 35 degrees of camshaft rotation.

In a ramp designed in accordance with the present invention, the first part of the lift, corresponding to a few camshaft degrees, is at constant acceleration, the next part of the ramp corresponding to say the next 8 degrees of camshaft rotation has its lift curve represented by the half period of a negative sine curve combined with an ascending straight line curve, and the next part, corresponding approximately to the next 16 degrees of camshaft rotation, has its lift curve represented by the quarter period of a positive sine curve combined with another ascending straight line curve, the half period of the first sine curve accelerating the tappet to the second quarter-period sine curve which commences at the maximum positive velocity of the first sine curve combined with the ascending straight line curve and decelerates the tappet to some predetermined constant velocity.

The invention is explained by reference to the accompanying drawings, in which:

Fig. 1 is a somewhat diagrammatic view of a cam of conventional form.

Figs. 2, 3 and 4 illustrate the lift curve, velocity curve and the acceleration curve respectively of an opening ramp of conventional or usual form.

Fig. 8 is a somewhat diagrammatic detail view illustrating the cam used with a valve tappet.

Referring to Fig. 1 of the drawings, the chain-line circle A is the usual base circle of the cam and B is the usual clearance circle. The part of the cam surface between C and D is the opening ramp which lifts the tappet from the clearance circle B to the base circle A so as to take up valve clearance. The part of the cam surface between E and F is the closing ramp.

Referring to Fig. 2, which illustrates the lift curve of a conventional form of opening ramp, the lift is measured along the vertical ordinate $y$ and the angle of rotation of the cam is measured along the horizontal ordinate $\theta$. It will be seen that for the first 2 degrees the tappet is lifted with increasing velocity while between 2 degrees and 30 degrees it is lifted at constant velocity.

Referring to the corresponding velocity curve shown in Fig. 3, in which the velocity is measured along with the vertical ordinate $\dot{y}$, it will be seen that for the first 2 degrees of rotation the velocity increases constantly, and that between 2 degrees and 30 degrees the velocity remains constant.

In the corresponding acceleration curve shown in Fig. 4, in which the acceleration is measured along the vertical ordinate $\ddot{y}$, it will be seen that the acceleration first rises instantly to maximum value and then remains constant throughout the first 2 degrees of rotation. At 2 degrees the acceleration falls instantly to zero value and between 2 degrees and 30 degrees it remains at zero value.

Figure 5:
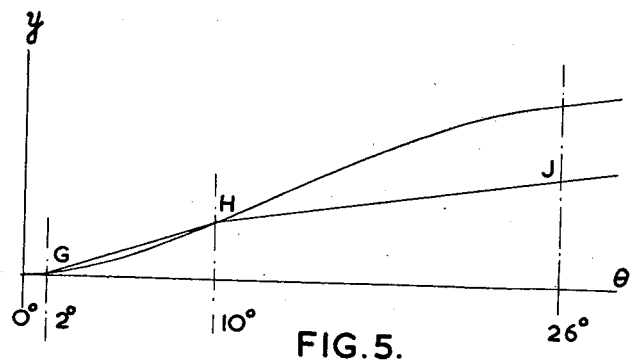
Figs. 5, 6 and 7 illustrate, respectively, the lift curve, velocity curve and acceleration curve of an opening ramp designed in accordance with the invention.

Referring now to Fig. 5, which illustrates the lift curve of a ramp designed according to this invention, it will be seen that during the first 2 degrees of rotation the tappet is lifted for a very short distance at increasing velocity in accordance with a parabolic lift curve, and that between 2 degrees and 10 degrees its lift increases in accordance with the half period of a negative sine curve plotted on an ascending straight line curve G, H. Between 10 degrees and 26 degrees the lift curve of the ramp is represented by a quarter period of a positive sine curve plotted on another ascending straight line curve H, J, and it is the slope of this straight line curve H, J which determines the slope of the final constant velocity portion of the ramp which is represented by a straight line tangent to the end of the quarter period positive sine curve and the velocity of this portion of which may be considerably less than that of the usual constant velocity ramp of the same clearance and angular displacement. It is this final slope which determines the opening and closing velocity of the valve.

Figure 6:
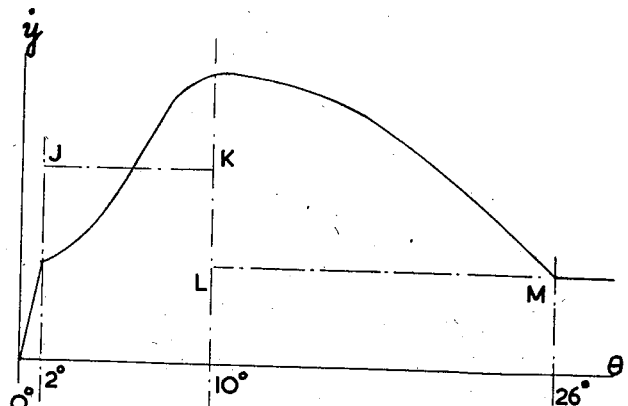

It will be seen from Fig. 6, which is the first differential of the lift curve (Fig. 5) and therefore represents the velocity of tappet lift, that between 0 degrees and 2 degrees the velocity rises constantly, and that from 2 degrees to 10 degrees the velocity rises in accordance with a negative half period co-sine curve plotted on a line J, K which is the first differential of the straight line G, H on which the negative half period sine curve of the lift curve of Fig. 5 is plotted. Between 10 degrees and 26 degrees the velocity falls according to a positive quarter period of a co-sine curve plotted on a line L, M which is the first differential of the straight line H, J upon which the positive quarter period sine wave of Fig. 5 is plotted. Beyond 26 degrees the velocity remains constant to the end of the ramp.

Figure 7:
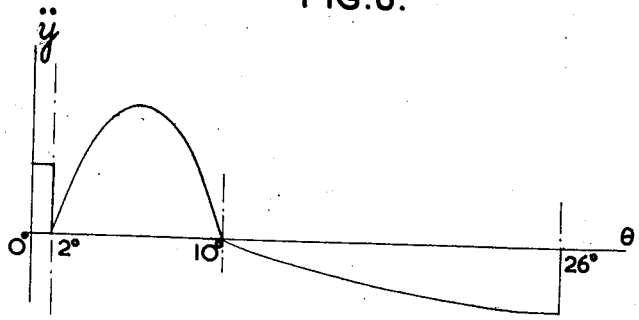

Referring to Fig. 7, which is the second differential of the lift curve and therefore represents the acceleration of tappet lift, it will be seen that at 0 degrees the acceleration rises instantly to a relatively small value, remains at that value between 0 degrees and 2 degrees, and then falls instantly to zero value. Between 2 degrees and 10 degrees the acceleration varies in accordance with a positive half sine curve, and between 10 degrees and 26 degrees it becomes negative and varies according to a negative quarter period sine curve. At 26 degrees the acceleration instantly changes to zero value and thereafter remains constant at zero value to the end of the ramp. Thus for the negative half period sine wave of the lift curve the tappet will be subjected to a positive acceleration, rising to a maximum value and falling to zero, and for the positive quarter period sine wave of the lift curve the tappet will be subjected to a negative acceleration. The negative acceleration will be considerably less than that of a ramp described in the specification of U. S. patent application Serial No. 57,873 of 1948, now Patent No. 2,567,-690, issued September 11, 1951 and for this reason the provision of a small spring yieldingly to oppose the upward motion of the tappet is not essential since the friction of the tappet in the guide will be sufficient to maintain contact with the ramp.

By suitable choice of a constant acceleration for the first few degrees of camshaft rotation and by varying the slope of the ascending straight line curves G, H and H, J it can be arranged that, at the end of the period of the final constant velocity ramp, the actual lift is the same as that obtained with a common constant velocity ramp.

It will be seen that the main portion of the ramp is represented by a half-period negative since curve and a quarter period sine curve based respectively upon the ascending straight line curves G, H, and H, J, the slopes of which latter can be varied to suit the initial and final constant velocity portions of the ramp, and in this respect the invention is distinguished from that of my patent application Serial No. 57,873, filed November 2, 1948, in which the main portion of the ramp is represented by a full period negative sine curve based upon a single ascending straight line curve.

The closing ramp may have the same characteristics as the opening ramp but in the reverse order.

Referring to Fig. 8 tappet R is slidably mounted in a portion of an engine and has its lower end in operative relation to the cam M and is raised and lowered as cam M rotates. A stem P of a valve contacts the upper end of the tappet and is moved thereby to operate the usual valve controlling a port to the combustion chamber of an engine.

Having fully described my invention, what I claim and desire to secure by Letters Patent is:

1. An operating mechanism comprising a movable member, an element actuated by said movable member, and a rotary cam having a peripheral surface adapted to engage and move said member, said surface having a lifting portion and a circular portion of smaller radius than the base circle of said cam whereby clearance is provided between said member and said element, a ramp portion connecting said lifting portion and said clearance portion, the contour of the major part of said ramp portion being represented by a lift curve consisting of two functions in series, the first function consisting of a half period negative sine curve combined with an ascending straight line curve, whereby said member is accelerated from a predetermined velocity to a positive maximum velocity with the acceleration represented by a positive half period sine curve, the second function consisting of a quarter period positive sine curve combined with another ascending straight line curve whereby said member is decelerated from said maximum positive velocity to another predetermined constant velocity with the acceleration represented by a quarter period negative sine curve.

2. An operating mechanism comprising a movable member, an element actuated by said movable member, and a rotatable cam having a peripheral surface adapted to engage and move said member, said peripheral surface having a lifting portion and a circular portion interconnected by a ramp portion, the contour of the major part of said ramp portion being represented by a lift curve consisting of two functions in series, the first function consisting of a half period negative sine curve combined with an ascending straight line curve, whereby said member is accelerated from a predetermined velocity to a positive maximum velocity with the acceleration represented by a positive half period sine curve, the second function consisting of a quarter period positive sine curve combined with another ascending straight line curve whereby said member is decelerated from said maximum positive velocity to another predetermined constant velocity with the acceleration represented by a quarter period negative sine curve.

3. An operating mechanism comprising a movable member, an element actuated by said movable member, and a rotating cam having a peripheral surface adapted to engage and move said member, said peripheral surface having a lifting portion and a circular portion interconnected by a ramp portion, the contour of the major part of said ramp portion being represented by a lift curve consisting of three functions in series, the first function consisting of a half period sine curve combined with an ascending straight line curve, whereby said member is accelerated from a predetermined velocity to a positive maximum velocity with the acceleration represented by a positive half period sine curve, the second function consisting of a quarter period positive sine curve combined with another ascending straight line curve whereby said member is decelerated from said maximum positive velocity to another predetermined constant velocity with the acceleration represented by a quarter period negative since curve, and the third function consisting of a straight line curve tangent to the end of said one quarter period negative sine curve whereby said member is moved at a minimum constant velocity with zero acceleration prior to contact with said lifting portion.

JOHN L. H. BISHOP.

REFERENCES CITED

The following references are of record in the file of this patent:

UNITED STATES PATENTS

| Number | Name | Date |
| --- | --- | --- |
| 1,175,687 | Birkigt | Mar. 14, 1916 |
| 1,254,840 | Nacker | Jan. 29, 1918 |
| 1,365,735 | Sherbondy | Jan. 18, 1921 |
| 1,635,304 | Baster | July 21, 1927 |
| 1,705,803 | Brush et al. | Mar. 19, 1929 |
| 2,292,728 | Walti | Aug. 11, 1942 |